United States Patent
Albert et al.

(10) Patent No.: US 10,894,801 B2
(45) Date of Patent: Jan. 19, 2021

(54) PROCESS FOR PRODUCING ALKYLALKOXYSILANES

(71) Applicant: Evonik Operations GmbH, Essen (DE)

(72) Inventors: Philipp Albert, Rheinfelden (DE); Eckhard Just, Rheinfelden (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/458,632

(22) Filed: Jul. 1, 2019

(65) Prior Publication Data

US 2020/0010491 A1    Jan. 9, 2020

(30) Foreign Application Priority Data

Jul. 3, 2018    (DE) .................. 10 2018 210 886

(51) Int. Cl.
*C07F 7/18*    (2006.01)
*B01J 31/28*    (2006.01)

(52) U.S. Cl.
CPC ............ *C07F 7/1876* (2013.01); *B01J 31/28* (2013.01); *B01J 2231/323* (2013.01); *B01J 2531/828* (2013.01)

(58) Field of Classification Search
CPC . B01J 31/28; B01J 2231/323; B01J 2531/828
See application file for complete search history.

(56) References Cited

U.S. PATENT DOCUMENTS

| | | | | |
|---|---|---|---|---|
| 5,041,595 A * | 8/1991 | Yang | .............. | C07F 7/1876 556/479 |
| 5,986,124 A * | 11/1999 | Tachikawa | .............. | C07F 7/1876 556/479 |
| 6,048,994 A | 4/2000 | Tachikawa et al. | | |
| 6,100,408 A | 8/2000 | Monkiewicz et al. | | |
| 6,150,551 A | 11/2000 | Kropfgans et al. | | |
| 6,153,782 A | 11/2000 | Kräuter et al. | | |
| 6,242,628 B1 | 6/2001 | Kropfgans et al. | | |
| 6,414,176 B2 * | 7/2002 | Preiss | .............. | C07F 7/14 556/479 |
| 6,727,375 B2 | 4/2004 | Steding et al. | | |
| 6,858,746 B2 | 2/2005 | Giessler et al. | | |
| 8,039,646 B2 * | 10/2011 | Bade | .............. | C07F 7/1876 549/214 |
| 8,426,628 B2 | 4/2013 | Just et al. | | |
| 2002/0188146 A1 | 12/2002 | Steding et al. | | |
| 2003/0100784 A1 | 5/2003 | Giessler et al. | | |
| 2010/0036146 A1 | 2/2010 | Bade et al. | | |
| 2011/0118496 A1 | 5/2011 | Just et al. | | |
| 2013/0158281 A1 | 6/2013 | Weller et al. | | |
| 2019/0048031 A1 | 2/2019 | Rudek et al. | | |

FOREIGN PATENT DOCUMENTS

| | | | |
|---|---|---|---|
| CN | 101850271 A | * 10/2010 | |
| CN | 103936782 A | * 7/2014 | |
| CZ | 195549 | 2/1980 | |
| EP | 0 587 462 | 3/1994 | |
| EP | 0 587 462 B1 | 3/1997 | |
| EP | 0 856 517 | 8/1998 | |
| EP | 3 027 305 | 6/2016 | |
| JP | 05286985 A | * 11/1993 | |
| JP | 08027165 A | * 1/1996 | |
| JP | 08269070 A | * 10/1996 | |
| JP | 08319293 A | * 12/1996 | |
| JP | 4266400 | 2/2009 | |
| JP | 4266400 | 5/2009 | |
| JP | 4540141 | 9/2010 | |
| WO | WO-2008017562 A1 * | 2/2008 | .......... B01J 19/0093 |
| WO | 2015/014530 | 2/2015 | |

OTHER PUBLICATIONS

X. Liu et al., 3 Chinese Chemical Letters, 255-256 (1992) (Year: 1992).*
X. Liu et al., 3 Chinese Chemical Letters, 589-592 (1992) (Year: 1992).*
X. Wang et al., Advanced Materials Research, 289-301 (2013) (Year: 2013).*
English-Language Machine Translation JP-05286985-A (1993) (Year: 1993).*
CAS Abstract J. Nishino, JP 05286985 (1993) (Year: 1993).*
CAS Abstract M. Takei, JP 08269070 (1996) (Year: 1996).*

(Continued)

*Primary Examiner* — Alexander R Pagano
(74) *Attorney, Agent, or Firm* — Grüneberg and Myers PLLC

(57) ABSTRACT

A process produces a $C_3$- to $C_{20}$-alkyltrialkoxysilane by hydrosilylation, wherein alkoxy represents methoxy, ethoxy or propoxy. Initially, a mixture is charged of at least one hydroalkoxysilane from the group of hydrotrialkoxysilane, hydroalkyldialkoxysilane, and hydrodialkylalkoxysilane, and a Pt catalyst. The mixture is then heated to a temperature of 30° C. to 60° C. Subsequently, with mixing, an omega-unsaturated or mono-unsaturated $C_3$- to $C_{20}$-hydrocarbon, at least one carboxylic acid and at least one alcohol as cocatalysts are added to the mixture. The mixture is then reacted and subsequently worked up to obtain the product.

20 Claims, No Drawings

(56) References Cited

OTHER PUBLICATIONS

English-Language Machine Translation JP 08269070 (1996) (Year: 1996).*
English-Language Machine Translation WO2008017562 (2008) (Year: 2008).*
CAS Abstract, L. Juergen WO 2008017562 (2008) (Year: 2008).*
CAS Abstract M. Takei, JP 08027165 (1996) (Year: 1996).*
English-Language Machine Translation JP 08027165 (1996) (Year: 1996).*
CAS Abstract M. Takei, JP 08319293 (1996) (Year: 1996).*
English-Language Machine Translation JP 08319293 (1996) (Year: 1996).*
CAS Abstract P. Li, CN 103936782 (2014) (Year: 2014).*
English-Language Machine Translation CN 103936782 (2014) (Year: 2014).*
CAS Abstract B. Ying, CN 101850271 (2010) (Year: 2010).*
English-Language Machine Translation CN 101850271 (2010) (Year: 2010).*
F. Rao et al., 46 Catalyst Communications, 1-5 (2014) (Year: 2014).*
Y. Bai et al., 394 Journal of Colloid and Interface Science, 428-433 (2013) (Year: 2013).*
D. Loy et al., 362 Journal of Non-Crystalline Solids, 82-94 (2013) (Year: 2013).*
B. Ying et al., 20 Chinese Journal of Chemical Engineering, 246-253 (2012) (Year: 2012).*
B. Ying et al., 17 Chinese Journal of Chemical Engineering, 1038-1042 (2009) (Year: 2009).*
E. Chernyshev et al., 76 Russian Journal of General Chemistry, 225-228 (2006) (Year: 2006).*
A. Prignano et al., 109 Journal of the American Chemical Society, 3586-3595 (1987) (Year: 1987).*
U.S. Pat. No. 6,100,408, filed Aug. 8, 2000, Monkiewicz et al.
U.S. Pat. No. 6,150,551, filed Nov. 21, 2000, Kropfgans et al.
U.S. Pat. No. 6,153,782, filed Nov. 28, 2000, Kräuter et al.
U.S. Pat. No. 6,242,628, filed Jun. 5, 2001, Kropfgans et al.
European Search Report dated Nov. 14, 2019 in European Patent Application No. 19183332.6.

* cited by examiner

PROCESS FOR PRODUCING ALKYLALKOXYSILANES

CROSS-REFERENCE TO RELATED APPLICATIONS

The present application claims the benefit of the German Application DE102018210886.2, filed on Jul. 3, 2018, which is incorporated by reference in its entirety.

BACKGROUND OF THE INVENTION

Field of the Invention

The present invention relates to a particularly economic process for producing longer-chain alkylalkoxysilanes from an alkene [also referred to hereinbelow as olefin or olefin component] and a hydrotrialkoxysilane, hydroalkyldialkoxysilane or hydrodialkylalkoxysilane [also referred to hereinbelow as H-silane(s) for short] in the presence of a Pt catalyst, a carboxylic acid and a further cocatalyst by hydrosilylation.

Discussion of the Background

Alkylalkoxysilanes are hydrophobic on account of the alkyl group and are important chemical compounds today. This results in a wide variety of applications. They may be employed for example as a hydrophobic component in sol-gel systems or be applied in pure form or in formulations to the widest possible variety of substrates to achieve a hydrophobic effect. Typical applications are hydrophobization of fillers, of concrete and of further inorganic materials. However, they may also be used as an additive in lacquers.

Processes for hydrosilylation have long been known and have been described numerous times.

JP4266400B describes the production of an aromatic silane compound by hydrosilylation of an aromatic vinyl compound. The catalyst employed is a platinum complex in the presence of a carboxylic acid.

U.S. Pat. No. 5,986,124 relates to a process for producing a silane compound by hydrosilylation of a carbon double bond using a trialkoxyhydrosilane in the presence of a platinum catalyst and a carboxylic acid. A molar trialkoxyhydrosilane/carboxylic acid ratio of $1:26 \times 10^{-3}$ is employed in example 1 and of $1:13 \times 10^{-3}$ is employed in example 2. While the use of platinum catalysts with carboxylic acids makes it possible to achieve a conversion of about 80% in the hydrosilylation, crude products thus obtained still comprise a considerable proportion of impurities and/or byproducts.

EP 0587462 describes a composition composed of an unsaturated polyorganosiloxane, an organohydropolysiloxane, an acid, a platinum compound and additives, wherein the components are emulsified in water and used for release-layer treatment. The crosslinking by hydrosilylation is effected upon heating.

EP 0856517 discloses a process for hydrosilylation of an unsaturated compound in the presence of a metal compound of transition groups 8 to 10 of the Periodic Table. The hydrosilylation is performed in the presence of an accelerator.

US 2013/0158281 discloses a process for hydrosilylation of an unsaturated compound with a silyl hydride. Catalysts employed are Fe complexes, Ni complexes, Mn complexes or Co complexes.

CS 195549 relates to the hydrosilylation of vinylcyclohexane with hydrosilanes. In example 4, vinylcyclohexane is hydrosilylated using triethoxysilane in the presence of platinic acid and trifluoroacetic acid.

The problem addressed by the present invention was that of providing the most economic possible process for producing alkylalkoxysilanes in which alkyl represents in particular—but not exclusively—$C_3$- to $C_{20}$-alkyls, alkoxy represents methoxy, ethoxy or propoxy and a Pt catalyst is used in combination with a carboxylic acid as a cocatalyst, wherein the proportion of carboxylic acid remaining in the product is as low as possible. A further objective was to reduce the disadvantages recited hereinabove through specific reaction management, through specific input material ratios and/or further additions. Further objectives included performing the process with the smallest possible concentration of costly platinum and without the separate addition of an aliphatic or aromatic solvent and increasing the yield of target product if possible.

The problem is solved in accordance with the invention according to the features in the embodiments.

SUMMARY OF THE INVENTION

It has now been found that, surprisingly, substantially better yields of target product, i.e. of an alkylalkoxysilane, are achieved when performing the hydrosilylation comprises initially charging the hydroalkoxysilane [also referred to as H-silane for short] together with a Pt catalyst, heating the initially charged mixture and subsequently, with mixing, metering the olefin component together with a carboxylic acid into the initial charge over a defined period and post-reacting the mixture and advantageously adding a small amount of a further cocatalyst in the form of at least one alcohol, in particular tert-butanol, to the olefin-carboxylic acid mixture, thus further markedly boosting the reaction, selectivity and thus the yield of the hydrosilylation. The molar ratio of the H-silane to carboxylic acid may therefore be advantageously reduced to a molar ratio of $1:\leq 10 \times 10^{-3}$, in particular to $1:\leq 6 \times 10^{-3}$, which has a positive effect on the residual content of carboxylic acid in the product and is advantageous for the performance properties thereof.

The present invention includes the following embodiments:

1. Process for producing a $C_3$- to $C_{20}$-alkyltrialkoxysilane by hydrosilylation, wherein alkoxy represents methoxy, ethoxy or propoxy, comprising
   initially charging a mixture of at least one hydroalkoxysilane from the group of hydrotrialkoxysilane, hydroalkyldialkoxysilane, hydrodialkylalkoxysilane and a Pt catalyst,
   heating the mixture to a temperature of 30° C. to 60° C.,
   subsequently, with mixing, adding/metering an omega-unsaturated or mono-unsaturated $C_3$- to $C_{20}$-hydrocarbon, at least one carboxylic acid and at least one alcohol as cocatalysts.
   reacting the mixture and subsequently working up the thus-obtained product mixture.
2. Process according to embodiment 1, characterized in that H-silane and alcohol are employed in a molar ratio of 1:0.01 to 0.2, preferably 1:0.02 to 0.18, particularly preferably 1:0.03 to 0.15, very particularly preferably 1:0.04 to 0.1, in particular 1:0.05 to 0.06.
3. Process according to embodiment 1 or 2, characterized in that H-silane and Pt are employed in a molar ratio of $1:1 \times 10^{-4}$ to $1 \times 10^{-9}$, preferably $1:1 \times 10^{-5}$ to $3 \times 10^{-8}$, especially $1:1 \times 10^{-5}$ to $9.0 \times 10^{-6}$.

4. Process according to any of the preceding embodiments, characterized in that H-silane and carboxylic acid are employed in a molar ratio of $1:1\times10^{-4}$ to $10\times10^{-3}$, preferably $1:2\times10^{-3}$ to $8\times10^{-3}$, in particular $1:2\times10^{-3}$ to $6\times10^{-3}$.
5. Process according to any of the preceding embodiments, characterized in that H-silane and olefin component are employed in a molar ratio of 1:1 to 1.2, preferably of 1:1.05 to 1.2.
6. Process according to any of the preceding embodiments, characterized in that the carboxylic acid is selected from the group of benzoic acid, 3,5-di-tert-butylbenzoic acid, 3,5-di-tert-butyl-4-hydroxybenzoic acid.
7. Process according to any of the preceding embodiments, characterized in that the alcohol is selected from the group of $C_1$-$C_{10}$-alcohols, preferably t-butanol.
8. Process according to any of the preceding embodiments, characterized in that the H-silane employed is hydrotrimethoxysilane (TMOS), hydrotriethoxysilane (TEOS), methyldiethoxysilane (DEMS), methyldimethoxysilane (DMMS), dimethylethoxysilane (DMES), dimethylmethoxysilane (MDMS), hydrotripropoxysilane, hydromethyldipropoxysilane and/or hydrodimethylpropoxysilane.
9. Process according to any of the preceding embodiments, characterized in that it comprises employing a Pt catalyst from the group of "Karstedt catalyst", preferably platinum(0) 1,3-divinyl-1,1,3,3-tetramethyldisiloxane complex, in particular as a "Karstedt catalyst" in xylene or toluene with a Pt(0) content of 0.5% to 5% by weight, hexachloroplatinic(IV) acid, preferably "Speyer catalyst", in particular hexachloroplatinic(IV) acid dissolved in acetone, or Pt applied to a solid catalyst support, preferably Pt supported on activated carbon.
10. Process according to any of the preceding embodiments, characterized in that it comprises
    initially charging and heating the components H-silane and Pt catalyst as a mixture,
    combining the olefin component, the carboxylic acid and the alcohol and metering the mixture containing the olefin component, the carboxylic acid and the alcohol into the initial charge with mixing over a period of 1 to 10 hours at a temperature in the initial charge of 30-60° C. and
    subsequently post-reacting the mixture over a period of 0.2 to 2 hours, wherein the reaction is preferably performed under protective gas, in particular under nitrogen, wherein any heterogeneous catalyst present may optionally be removed from the thus-obtained product mixture,
    the subsequent distillative workup of the obtained product mixture is preferably performed at 45-150° C. and a reduced pressure, in particular to remove from the product mixture any low boilers present, for example xylene/toluene, alcohol, carboxylic acid, excess H-silane and any olefin component present, and to obtain the (target) product.
11. Process according to any of the preceding embodiments, characterized in that 1-hexadecene is employed as the olefin component.

DETAILED DESCRIPTION OF THE INVENTION

It has proven particularly advantageous when the present process is preferably performed with a homogeneous platinum(0) complex catalyst, especially a "Karstedt catalyst", a Speyer catalyst, hexachloroplatinic(IV) acid or a supported, i.e. heterogeneous, Pt catalyst, for example Pt on activated carbon. A "Karstedt catalyst" is moreover preferably used in the form of a platinum(0) complex catalyst solution, especially dissolved in xylene or toluene. The present procedure also makes it possible to reduce the content of Pt catalyst and the Pt loss, thus saving costly Pt. It has further proven particularly advantageous in the present process to use a carboxylic acid from the group of benzoic acid, 3,5-di-tert-butylbenzoic acid and/or 3,5-di-tert-butyl-4-hydroxybenzoic acid.

A product mixture obtained by the present process is suitably worked up by distillation, optionally under reduced pressure, and the desired (target) product is obtained. When using a heterogeneous catalyst, this may suitably be separated from the product mixture prior to the distillation, for example by filtration or centrifugation, and this thus-recovered Pt catalyst may advantageously be recycled into the process.

Thus, the target product is obtained as bottoms product in the distillation performed after the reaction and after any removal of a heterogeneous catalyst: the target product is not distilled over in the distillative workup and is obtained as a colourless bottoms product. Should a particularly high purity be required, the product may also be distilled. The present process may moreover be performed particularly economically even at a relatively low temperature of 30-60° C.

In the present process the double bonds of the olefin component used here can thus advantageously be hydrosilylated practically completely and advantageously only very few byproducts are formed.

Furthermore, the present, i.e. inventive, process may advantageously be performed without separate addition of an aliphatic or aromatic hydrocarbon as solvent or diluent and with only a small proportion of the (co)catalyst component carboxylic acid remaining in the target product.

The present invention thus provides a process for producing a $C_3$- to $C_{20}$-alkyltrialkoxysilane by hydrosilylation, wherein alkoxy represents methoxy, ethoxy or propoxy, comprising
    initially charging a mixture of at least one hydroalkoxysilane from the group of hydrotrialkoxysilane, hydroalkyldialkoxysilane, hydrodialkylalkoxysilane [also referred to hereinbelow as H-silane for short] and a Pt catalyst,
    heating the mixture to a temperature of 30° C. to 60° C.,
    subsequently, with mixing, adding/metering an omega-unsaturated or mono-unsaturated $C_3$- to $C_{20}$-hydrocarbon [also referred to hereinbelow as olefin component for short], at least one carboxylic acid and at least one alcohol as cocatalysts.
    reacting the mixture and subsequently working up the thus-obtained product mixture.

In the process according to the invention, H-silane and olefin component are advantageously employed in a molar ratio of 1:1 to 1.2, preferably of 1:1.05 to 1.2, wherein representative and exemplary examples of just some of the possible intermediate values apparent to and derivable by a person skilled in the art from the preceding or present information include in particular 1:1.01, 1:1.03, 1:1.08, 1:1.1, 1:1.13, 1:1.15, 1:1.18.

The H-silane employed is preferably hydrotrimethoxysilane (TMOS), hydrotriethoxysilane (TEOS), methyldiethoxysilane (DEMS), methyldimethoxysilane (DMMS), dimethylethoxysilane (DMES), dimethylmethoxysilane (MDMS), hydrotripropoxysilane, hydromethyldipropoxysilane and/or hydrodimethylpropoxysilane.

The process according to the invention further preferably employs 1-hexadecene as the olefin component.

It is advantageously preferable in the process according to the invention to employ H-silane and alcohol in a molar ratio of 1:0.01 to 0.2, preferably 1:0.02 to 0.18, particularly preferably 1:0.02 to 0.15, very particularly preferably 1:0.025 to 0.1, in particular 1:0.03 to 0.06. The alcohol selected for this purpose is preferably tert-butanol.

It is further advantageous in the process according to the invention to employ H-silane and Pt in a molar ratio of $1:1\times10^{-4}$ to $1\times10^{-9}$, preferably $1:1\times10^{-5}$ to $1\times10^{-8}$, in particular of $1:1\times10^{-5}$ to $9\times10^{-6}$.

The Pt catalyst employed is suitably a heterogeneous Pt catalyst, preferably Pt applied to a solid catalyst support, in particular Pt on activated carbon, or a homogeneous Pt catalyst, preferably a Pt complex catalyst, such as hexachloroplatinic(IV) acid, also known as "Speyer catalyst", in particular hexachloroplatinic(IV) acid dissolved in acetone, preferably a Pt(0) complex catalyst, particularly preferably a "Karstedt catalyst", very particularly preferably a platinum (0)-1,3-divinyl-1,1,3,3-tetramethyldisiloxane complex, in particular a "Karstedt catalyst" in xylene or toluene with a Pt(0) content of 0.5% to 5% by weight. Such a solution generally contains a platinum(0) 3-divinyl-1,1,3,3-tetramethyldisiloxane complex dissolved in xylene or toluene and a solution used in accordance with the invention is advantageously employed in diluted form and preferably has a Pt content of 0.5% to 5% by weight. Thus, in the process according to the invention it is advantageous to use a Pt catalyst from the group of "Karstedt catalyst", in particular a "Karstedt catalyst" solution, preferably platinum(0) 1,3-divinyl-1,1,3,3-tetramethyldisiloxane complex in xylene or toluene with a Pt(0) content of 0.5% to 5% by weight, hexachloroplatinic(IV) acid, preferably "Speyer catalyst", in particular hexachloroplatinic(IV) acid dissolved in acetone, or Pt supported on activated carbon.

Furthermore, in the process according to the invention H-silane and carboxylic acid are preferably employed in a molar ratio of $1:1\times10^{-3}$ to $10\times10^{-3}$, particularly preferably $1:1\times10^{-3}$ to $8\times10^{-3}$, in particular of $1:2\times10^{-3}$ to $6\times10^{-3}$.

The carboxylic acid is advantageously selected from the group of benzoic acid, 3,5-di-tert-butylbenzoic acid and 3,5-di-tert-butyl-4-hydroxybenzoic acid.

The process according to the invention is preferably performed by
  initially charging and heating the components H-silane and Pt catalyst as a mixture,
  combining the olefin component, the carboxylic acid and the alcohol and metering the mixture containing the olefin component, the carboxylic acid and the alcohol into the initial charge with mixing over a period of 1 to 10 hours at a temperature in the initial charge of 30-60° C. and
  subsequently post-reacting the mixture over a period of 0.2 to 2 hours, wherein the reaction is preferably performed under protective gas, in particular under nitrogen, wherein any heterogeneous catalyst present may optionally be removed from the thus-obtained product mixture,
  the subsequent distillative workup of the obtained product mixture is preferably performed at 45-150° C. and a reduced pressure, in particular to remove from the product mixture any low boilers present, for example xylene/toluene, alcohol, carboxylic acid, excess H-silane and any olefin component present, and to obtain the (target) product.

The process according to the invention—with all of its possible combinations of the features detailed in the present description—may therefore generally be performed as follows:

Performing the hydrosilylation according to the invention to produce an alkylmethoxy- or alkylethoxysilane having long alkyl chains comprises initially charging the hydroalkoxysilane (H-silane), preferably trimethoxysilane (TMOS), triethoxysilane (TEOS-H), methyldiethoxysilane (DEMS), methyldimethoxysilane (DMMS), dimethylethoxysilane (DMES), dimethylmethoxysilane (MDMS), hydrotripropoxysilane, hydromethyldipropoxysilane and/or hydrodimethylpropoxysilane, together with a platinum catalyst, suitably a "Speyer catalyst", preferably hexachloroplatinic(IV) acid dissolved in acetone or hexachloroplatinic(IV) acid hexahydrate dissolved in acetone, or a "Karstedt catalyst", wherein said catalyst is preferably employed as a platinum(0) complex catalyst solution, or Pt on activated carbon in a stirred reactor fitted with metering, heating/cooling, reflux and distillation apparatuses, suitably under protective gas, for example nitrogen, and heating the initially charged mixture advantageously to a temperature of 30° C. to 60° C. This is followed by addition/metering, with mixing, of the olefin component, at least one carboxylic acid, preferably benzoic acid, 3,5-di-tert-butylbenzoic acid and/or 3,5-di-tert-butyl-4-hydroxybenzoic acid and at least one alcohol, for example any of the abovementioned $C_1$-$C_{10}$-alcohols, in particular t-butanol, as a further so-called cocatalyst: The components olefin, carboxylic acid and alcohol may be added or metered into the hydroalkoxysilane/platinum(0) complex catalyst mixture of the initial charge portionwise or continuously individually in succession or advantageously in the form of an olefin/carboxylic acid/alcohol mixture over a defined period, preferably under temperature control and over 1 to 10 or more hours, wherein the metering time may, however, be dependent on the batch size and the reactor design, and the reaction/product mixture is post-reacted, preferably with mixing and under temperature control, suitably at a temperature of 60-100° C., in particular over 0.5 to 2 hours. Thus, in the present processes the respective input materials are preferably employed in a well-defined molar ratio:
  H-silane to olefin component in a molar ratio of 1:1 to 1.2
  H-silane to alcohol in a molar ratio of 1:0.01 to 0.2
  H-silane to Pt in a molar ratio of $1:1\times10^{-4}$ to $1\times10^{-9}$
  H-silane to carboxylic acid in a molar ratio of $1:1\times10^{-3}$ to $10\times10^{-3}$ The employed Karstedt catalyst solution is further preferably produced from a commercially available so-called Karstedt concentrate (platinum(0) 1,3-divinyl-1,1,3,3-tetramethyldisiloxane complex, platinum content: 20.37% by weight), wherein the concentrate is preferably adjusted to a Pt content of 0.5% to 5% by weight by the addition of xylene or toluene. A thus-obtained product mixture is suitably worked up by distillation to obtain the desired (target) product. To this end, the distillation is preferably performed starting at 45° C. to 150° C. and a reduced pressure (vacuum distillation at less than 1 bar and falling, in particular not more than 0.1 bar) thus removing in particular any low boilers, for example alcohol, excess H-silane and any remaining olefin component, from the product mixture. If a heterogeneous Pt catalyst is used for performing the process according to the invention, the heterogeneous Pt catalyst may be separated from the product mixture obtained after the reaction in the course of the product workup, i.e. prior to the distillation step, for example by filtration or centrifugation, and advantageously recycled back into the process. However, to achieve higher purities, the product may also be distilled overhead.

Thus, according to the invention, alkylalkoxysilanes having a long chain alkyl group, in particular a hexadecyltrimethoxysilane and a hexadecyltriethoxysilane, may be produced in particularly simple and economic fashion in high yield and selectivity, i.e. with only small proportions of byproducts, advantageously also on a large industrial scale.

The examples which follow provide additional elucidation of the present invention without limiting the subject matter thereof:

EXAMPLES

Analytical Investigations

The progress of the reactions was followed by means of GC measurements.

GC column: HP-5; length: 30 m; diameter: 530 μm
Injection volume: 0.4 μl
Temperature program: 120° C.—2 min.—15° C./min.—275° C.—20 min.
Chemicals Used:
Karstedt concentrate (platinum(0) 1,3-divinyl-1,1,3,3-tetramethyldisiloxane complex,
platinum content: 20.37% by weight), HERAEUS
Acetone, pure, LABC Labortechnik
Hexachloroplatinic(IV) acid hexahydrate, platinum content 40% by weight. HERAEUS Platinum-activated carbon, hydrogenation catalyst, platinum content 10% by weight, MERCK
Xylene Technical, VWR Chemicals
Dynasylan® TMOS (trimethoxysilane), EVONIK Industries
Dynasylan® TEOS-H (triethoxysilane), EVONIK Industries
Dynasylan® DEMS (methyldiethoxysilane). EVONIK Industries
Dynasylan® DMES (dimethylethoxysilane), EVONIK Industries
1-Hexadecene, Dow Corning
Benzoic acid ≥99.5% by weight, ROTH
3,5-Di-tert-butylbenzoic acid >98.0% by weight, TOKYO CHEMICAL INDUSTRY
3,5-Di-tert-butyl-4-hydroxybenzoic acid, >98.0% by weight, TOKYO CHEMICAL INDUSTRY
Acetic acid, ≥99% by weight, SIGMA-ALDRICH
tert-Butanol, ≥99.0% by weight (for synthesis). ROTH
Production of "Karstedt-Catalyst" No. 1 with 2% by Weight Platinum Content in Xylene:
In a 0.2 l glass bottle, 9.8 g of "Karstedt concentrate" (platinum(0) 1,3-divinyl-1,1,3,3-tetramethyldisiloxane complex, platinum content 20.37%) were mixed with 90.2 g of xylene.

Comparative Example 1 Based on U.S. Pat. No. 5,986,124, Example 1, and with a Reduced Proportion of Carboxylic Acid 128.3 g of Dynasylanl TMOS (1.05 mol) and 0.2 g of Karstedt catalyst (corresponds to 0.02563 mmol of Pt) were initially charged in a 0.5 l stirred apparatus fitted with a reflux condenser and metering apparatus. At a temperature of 41-56° C. a mixture consisting of 224.4 g of hexadecene (1.0 mol) and 0.393 g of acetic acid (6.55 mmol) was metered in over 39 minutes. Thereafter, the mixture was held at 55° C. for a further ¾ hour. Subsequently, 17.2 g of low boilers were removed at 76-123° C. and a pressure of <0.1 mbar. 331.3 g of bottoms product were obtained.

GC analysis of the bottoms product showed the following composition:

| Sum of C16 olefin GC-WLD-FL % | n-C16-silane GC-WLD-FL % | Sum of C16 silane GC-WLD-FL % | Remainder GC-WLD-FL % |
|---|---|---|---|
| 9.8 | 89.0 | 89.5 | 0.7 |

Example 1

128.3 g of Dynasylan® TMOS (1.05 mol) and 0.2 g of Karstedt catalyst (corresponds to 0.02563 mmol of Pt) were initially charged in a 0.5 l stirred apparatus fitted with a reflux condenser and metering apparatus. At a temperature of 33-48° C., a mixture consisting of 224.4 g of 1-hexadecene (1.0 mol), 0.800 g of benzoic acid (6.55 mmol) and 2.5 g of t-butanol (33.73 mmol) was metered in over 2 hours. Thereafter, the mixture was held at 47° C. for a further ¾ hour. Subsequently, 12.1 g of low boilers were removed at 42-111° C. and a pressure of <0.1 mbar. 339.8 g of bottoms product were obtained. GC analysis of the bottoms product showed the following composition:

| Sum of C16 olefin GC-WLD-FL % | n-C16-silane GC-WLD-FL % | Sum of C16 silane GC-WLD-FL % | Remainder GC-WLD-FL % |
|---|---|---|---|
| 5.8 | 89.6 | 92.7 | 1.5 |

Example 2

128.3 g of Dynasylan® TMOS (1.05 mol) and 0.2 g of Karstedt catalyst (corresponds to 0.02563 mmol of Pt) were initially charged in a 0.5 l stirred apparatus fitted with a reflux condenser and metering apparatus. At a temperature of 48-57° C., a mixture consisting of 224.4 g of 1-hexadecene (1.0 mol), 1.64 g of 3,5-di-tert-butylhydroxybenzoic acid (6.55 mol) and 2.5 g oft-butanol (33.73 mmol) was metered in over 1 and ¾ hours. Thereafter, the mixture was held at 55° C. for a further ¾ hour. Subsequently, 13.9 g of low boilers were removed at 31-110° C. and a pressure of <0.1 mbar. 337.4 g of bottoms product were obtained. GC analysis of the bottoms product showed the following composition:

| Sum of C16 olefin GC-WLD-FL % | n-C16-silane GC-WLD-FL % | Sum of C16 silane GC-WLD-FL % | Remainder GC-WLD-FL % |
|---|---|---|---|
| 6.3 | 91.0 | 92.9 | 0.8 |

Example 3

172.5 g of Dynasylan® TEOS (1.05 mol) and 0.2 g of Karstedt catalyst (corresponds to 0.02563 mmol of Pt) were initially charged in a 1 l stirred apparatus fitted with a reflux condenser and metering apparatus. At a temperature of 45-46° C., a mixture consisting of 224.4 g of 1-hexadecene (1.0 mol), 0.800 g of benzoic acid (6.55 mmol) and 2.5 g of t-butanol (33.73 mmol) was metered in over 1 hour. Thereafter, the mixture was held at 46° C. for a further ½ hour. Subsequently, 20.1 g of low boilers were removed at 58-144° C. and a pressure of <0.1 mbar. 376.4 g of bottoms product were obtained. GC analysis of the bottoms product showed the following composition:

| Sum of C16 olefin GC-WLD-FL % | n-C16-silane GC-WLD-FL % | Sum of C16 silane GC-WLD-FL % | Remainder GC-WLD-FL % |
|---|---|---|---|
| 5.3 | 91.2 | 94.1 | 0.6 |

Example 4

141.0 g of Dynasylan® DEMS (1.05 mol) and 0.2 g of Karstedt catalyst (corresponds to 0.02563 mmol of Pt) were initially charged in a 1 l stirred apparatus fitted with a reflux condenser and metering apparatus. At a temperature of 41-47° C., a mixture consisting of 224.4 g of 1-hexadecene (1.0 mol), 0.800 g of benzoic acid (6.55 mmol) and 2.5 g of t-butanol (33.73 mmol) was metered in over 1 hour. Thereafter, the mixture was held at 46° C. for a further ½ hour. Subsequently, 16.3 g of low boilers were removed at 40-125° C. and a pressure of <0.1 mbar. 348.1 g of bottoms product were obtained. GC analysis of the bottoms product showed the following composition:

| Sum of C16 olefin GC-WLD-FL % | n-C16-silane GC-WLD-FL % | Sum of C16 silane GC-WLD-FL % | Remainder GC-WLD-FL % |
|---|---|---|---|
| 5.1 | 91.8 | 94.1 | 0.8 |

The experimental results in terms of yield and selectivity from the examples recited hereinabove are summarized in the table which follows.

The process according to the invention thus advantageously makes it possible to achieve a further improvement in yield and product selectivity.

| Experiment No. (Product) | $C_{16}$-Olefin GC-WLD-FL % | n-$C_{16}$-Alkylalkoxysilne GC-WLD-FL % | Sum of $C_{16}$-alkylalkoxysilane GC-WLD-FL % | Remainder GC-WLD-FL % |
|---|---|---|---|---|
| Comparative example 1 (hexadecyltrimethoxysilane) | 9.8 | 89.0 | 89.5 | 0.7 |
| Example 1 (hexadecyltrimethoxysilane) | 5.8 | 89.6 | 92.7 | 1.5 |
| Example 2 (hexadecyltrimethoxysilane) | 6.3 | 91.0 | 92.9 | 0.8 |
| Example 3 (hexadecyltriethoxysilane) | 5.3 | 91.2 | 94.1 | 0.6 |
| Example 4 (hexadecylmethyldiethoxysilane) | 5.1 | 91.8 | 94.1 | 0.8 |

The inventive experiments show that through the combination of the measures "procedure/process conditions," "reduction of cocatalyst proportion carboxylic acid based on the H-silane," and "addition of a further cocatalyst in the form of an alcohol," it is possible to achieve a further improvement in the yield of target product coupled with a reduction in the proportion of carboxylic acid remaining in the product.

The invention claimed is:

1. A process for producing a $C_3$- to $C_{20}$-alkyltrialkoxysilane by hydrosilylation, wherein alkoxy represents methoxy, ethoxy or propoxy, the process comprising:
   a) initially charging a mixture of
      at least one hydroalkoxysilane selected from the group consisting of hydrotrialkoxysilane, hydroalkyldialkoxysilane, and hydrodialkylalkoxysilane, and
      a Pt catalyst,
   b) heating the mixture to a temperature of 30° C. to 60° C.,
   c) subsequently, with mixing, adding/metering an omega-unsaturated or mono-unsaturated $C_3$- to $C_{20}$-hydrocarbon, at least one carboxylic acid and at least one alcohol as cocatalysts, and
   d) reacting the mixture and subsequently working up the mixture.

2. The process according to claim 1, wherein the at least one hydroalkoxysilane and the at least one alcohol are employed in a molar ratio of 1:0.01 to 1:0.2.

3. The process according to claim 1, wherein the at least one hydroalkoxysilane and the Pt catalyst are employed in a molar ratio of $1:1\times10^{-4}$ to $1:1\times10^{-9}$.

4. The process according to claim 1, wherein the at least one hydroalkoxysilane and the at least one carboxylic acid are employed in a molar ratio of $1:1\times10^{-3}$ to $1:10\times10^{-3}$.

5. The process according to claim 1, wherein the at least one hydroalkoxysilane and the $C_3$- to $C_{20}$-hydrocarbon are employed in a molar ratio of 1:1 to 1:1.2.

6. The process according to claim 1, wherein the at least one carboxylic acid is selected from the group consisting of benzoic acid, 3,5-di-tert-butylbenzoic acid, and 3,5-di-tert-butyl-4-hydroxybenzoic acid.

7. The process according to claim 1, wherein the at least one alcohol is at least one $C_1$-$C_{10}$-alcohol.

8. The process according to claim 1, wherein
   the at least one hydroalkoxysilane is selected from the group consisting of hydrotrimethoxysilane (TMOS), hydrotriethoxysilane (TEOS), methyldiethoxysilane (DEMS), methyldimethoxysilane (DMMS), dimethylethoxysilane (DMES), dimethylmethoxysilane (MDMS), hydrotripropoxysilane, hydromethyldipropoxysilane, and hydrodimethylpropoxysilane.

9. The process according to claim 1, wherein the Pt catalyst is at least one Pt catalyst selected from the group consisting of Karstedt catalyst, hexachloroplatinic(IV) acid, and Pt applied to a solid catalyst support.

10. The process according to claim 1, wherein the process comprises:

initially charging and heating the at least one hydroalkoxysilane and the Pt catalyst as a mixture, combining the omega-unsaturated or mono-unsaturated $C_3$- to $C_{20}$-hydrocarbon, the at least one carboxylic acid and the at least one alcohol and metering the combination into the mixture with mixing over a period of 1 to 10 hours at a temperature in the initial charge of 30° C.-60° C., post-reacting the mixture over a period of 0.2 to 2 hours, wherein any heterogeneous catalyst present may optionally be removed from the mixture, performing the subsequent distillative workup of the mixture, and obtaining a target product.

11. The process according to claim 1, wherein 1-hexadecene is employed as the $C_3$- to $C_{20}$-hydrocarbon.

12. The process according to claim 7, wherein the at least one alcohol is t-butanol.

13. The process according to claim 1, wherein the Pt catalyst is at least one Pt catalyst selected from the group consisting of platinum(0) 1,3-divinyl-1,1,3,3-tetramethyldisiloxane complex as a Karstedt catalyst, a Speyer catalyst as a hexachloroplatinic(IV) acid catalyst, and Pt applied to activated carbon as a solid catalyst support.

14. The process according to claim 1, wherein the Pt catalyst is at least one Pt catalyst selected from the group consisting of a Karstedt catalyst in xylene or toluene with a Pt(0) content of 0.5% to 5% by weight, and a hexachloroplatinic(IV) acid catalyst dissolved in acetone.

15. The process according to claim 10, wherein the post-reacting step is performed under protective gas.

16. The process according to claim 15, wherein the protective gas is nitrogen.

17. The process according to claim 10, wherein the distillative workup is performed at 45° C.-150° C. and a reduced pressure.

18. The process according to claim 10, wherein the distillative workup removes at least one low boiler selected from the group consisting of: xylene, toluene, alcohol, carboxylic acid, excess hydroalkoxysilane and any olefin component present.

19. The process according to claim 4, wherein the molar ratio is $1:2\times10^{-3}$ to $1:6\times10^{-3}$.

20. The process according to claim 10, further comprising distilling the target product.

* * * * *

UNITED STATES PATENT AND TRADEMARK OFFICE
CERTIFICATE OF CORRECTION

PATENT NO. : 10,894,801 B2
APPLICATION NO. : 16/458632
DATED : January 19, 2021
INVENTOR(S) : Philipp Albert et al.

It is certified that error appears in the above-identified patent and that said Letters Patent is hereby corrected as shown below:

On the Title Page

In the second page, Column 2, Lines 15-18 currently read:
"U.S. Pat. No. 6,100,408, filed Aug. 8, 2000, Monkiewicz et al.
U.S. Pat. No. 6,150,551, filed Nov. 21, 2000, Kropfgans et al.
U.S. Pat. No. 6,153,782, filed Nov. 28, 2000, Kriiuter et al. and
U.S. Pat. No. 6,242,628, filed Jun. 5, 2001, Kropfgans et al."

And should be:
--U.S. Pat. No. 6,100,408, issued Aug. 8, 2000, Monkiewicz et al.
U.S. Pat. No. 6,150,551, issued Nov. 21, 2000, Kropfgans et al.
U.S. Pat. No. 6,153,782, issued Nov. 28, 2000, Kriiuter et al. and
U.S. Pat. No. 6,242,628, issued Jun. 5, 2001, Kropfgans et al.--

Signed and Sealed this
Sixth Day of April, 2021

Drew Hirshfeld
*Performing the Functions and Duties of the
Under Secretary of Commerce for Intellectual Property and
Director of the United States Patent and Trademark Office*